March 23, 1954     H. W. ANDREWS ET AL     2,673,208
PROCESS FOR REMOVING ORGANIC SOLVENT
FROM AQUEOUS DETERGENT SOLUTIONS
Filed Aug. 9, 1951
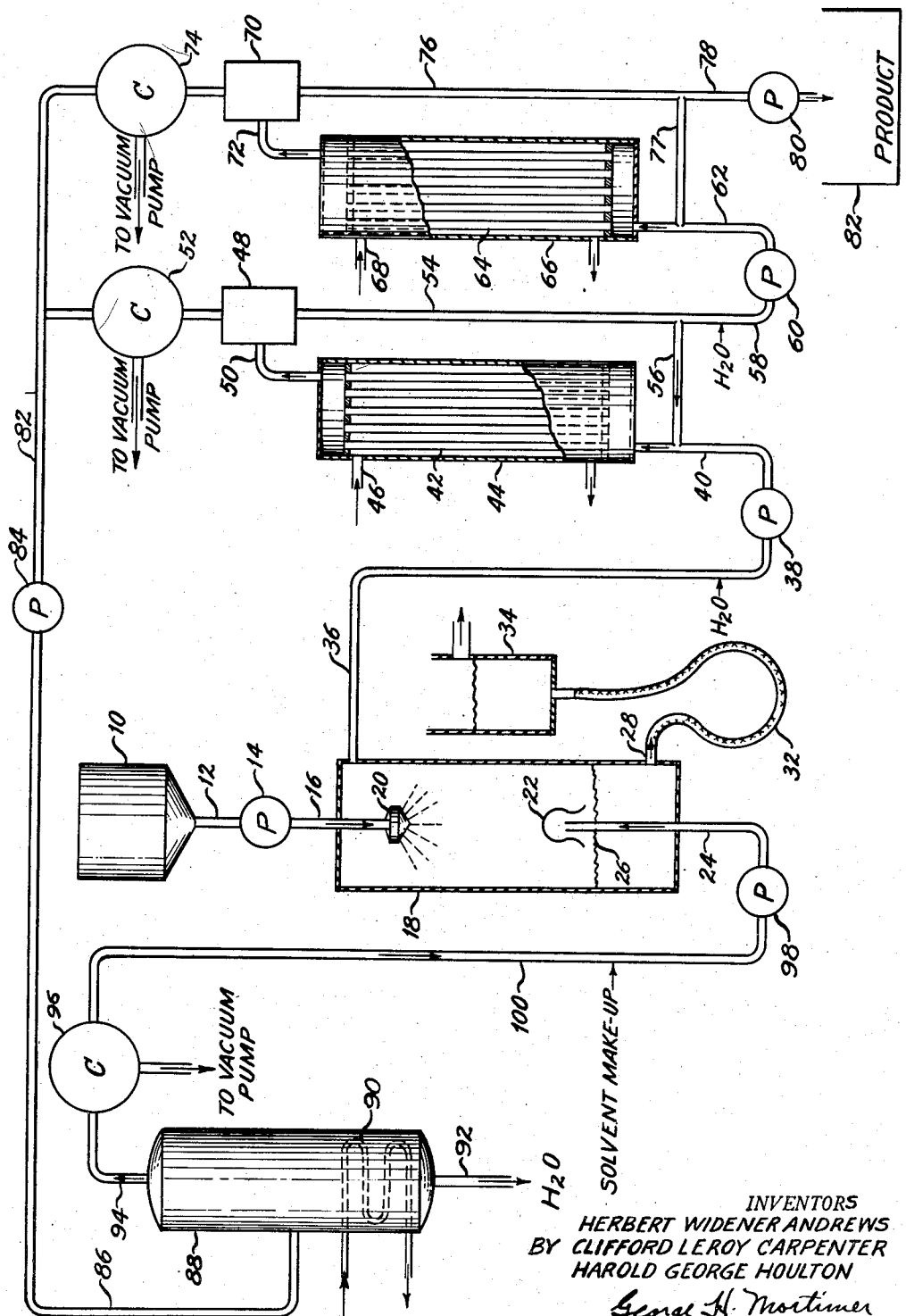
INVENTORS
HERBERT WIDENER ANDREWS
BY CLIFFORD LEROY CARPENTER
HAROLD GEORGE HOULTON
George H. Mortimer
ATTORNEY Patented Mar. 23, 1954

2,673,208

UNITED STATES PATENT OFFICE 2,673,208

PROCESS FOR REMOVING ORGANIC SOL-
VENT FROM AQUEOUS DETERGENT SO-
LUTIONS

Herbert Widener Andrews, Westfield, N. J., Clifford Le Roy Carpenter, Brooklyn, N. Y., and Harold George Houlton, Ridgewood, N. J., assignors to Colgate-Palmolive Company, a corporation of Delaware Application August 9, 1951, Serial No. 241,042

11 Claims. (Cl. 260—400)

The present invention relates to an improved process for purifying organic sulfonates and has particular reference to a continuous process for removing organic solvent from aqueous organic solvent extract solutions constaining organic sulfonate salt to produce aqueous organic sulfonate products having excellent detergent properties.

The production of organic sulfonate salts comprises, in general, admixing and reacting sulfonatable organic material with a suitable sulfonating agent and neutralizing the resultant sulfonation reaction mixture with alkaline material. When carrying out such a procedure, it is necessary to employ a sulfonating agent in excess of the stoichiometric amount required to effect the sulfonation. Inasmuch as the resultant sulfonation reaction mixture contains the residual amount of said sulfonating agent, subsequent neutraliziation of said reaction mixture results in the formation of a product containing a mixture comprising organic sulfonate salts together with inorganic salts of the sulfonating agent. The inorganic salts occur as a by-product impurity in the neutralized sulfonation reaction mixture. When sodium hydroxide, for example, is used to neutralize a sulfonation reaction mixture containing sulfuric acid as the sulfonating agent, in addition to the formation of a sodium salt of the organic sulfonate, sodium sulfate is also formed as a result of the reaction of the alkali with the excess sulfuric acid present upon completion of the sulfonation reaction. Similarly, when an organic base is used for neutralization the resulting neutralized reaction mixture includes the sulfate of the cation of the organic base.

The neutralized mixture, either directly or after spray drying, provides a product which may be used, for example, as a synthetic detergent for certain industrial and household uses. For some important uses, however, it is necessary to produce an organic sulfonate salt product which is substantially free from inorganic salts or which has a relatively low inorganic salt content. One known method which has been devised and described for preparing such an organic sulfonate salt product comprises extracting the organic sulfonate salt from the neutralized sulfonation reaction mixture by treating said mixture with at least one suitable organic solvent, e. g., an aliphatic alcohol containing at least two carbon atoms, such as ethanol, isopropanol, tertiary butanol, N-hexanol; monofatty acid esters of glycols such as ethylene glycol monoesters of coconut oil fatty acids; water soluble aliphatic ketones such as acetone, methyl ethyl ketone, diethyl ketone, and substituted derivatives thereof; isobutyric acid; dioxane; Cellosolve (ethylene glycol monoethyl ether); Cellosolve acetate (ethylene glycol monoethyl ether acetate); Carbitol (diethylene glycol monoethyl ether); etc. The introduction of a proper amount of organic solvent into an aqueous solution of the neutralized reaction mixture causes the system to separate into two distinct liquid layers, one layer containing an aqueous solution of the organic sulfonate salt and organic solvent substantially free from inorganic salt and another layer containing substantially all inorganic salt, practically no organic sulfonate salt and a very small proportion of the organic solvent. In some instances the aqueous organic solvent (extract) layer containing the organic sulfonate salt may be employed directly in the formation of certain synthetic detergent compositions. Many times, however, it is desirable to prepare an aqueous organic sulfonate salt product which is substantially free of the organic solvent as well as the inorganic salts. Such an aqueous product may be incorporated directly, for example, into finished compositions which themselves are aqueous in nature, e. g., dental creams, shampoos, deodorants, shaving creams, etc.

In the past several methods have been suggested for separating the organic sulfonate salt and the water from the organic solvent but such processes have certain disadvantages and limitations which lessen their desirability for adaptation to industrial operations. Certain of the suggested methods, for example, are undesirable inasmuch as they require the use of expensive heat drying equipment such as spray towers, drum dryers and the like. Furthermore, relatively unsatisfactory products are obtained when, for example, spray towers are employed to effect the separation. The high temperatures to which the materials are necessarily subjected results in a certain amount of undesirable charring of the sulfonate product. Certain other methods have been devised which do not require the use of expensive spray towers, etc., however, it is impossible, when employing such methods, to produce a product which contains the organic solvent in an amount less than 0.1% by weight. If a product which contains an organic solvent such as isopropanol in a concentration in excess of this amount is incorporated in a dental cream or deodorant or the like, it has been found that the alcohol imparts an offensive and undesirable odor to the finished composition.

The surprising discovery has now been made that organic solvent may be removed from aqueous organic solvent extract solutions containing organic sulfonate salt by a continuous process to produce aqueous organic sulfonate salt products which are substantially free of organic solvent and which have excellent detergent properties. In accordance with the present invention, the removal of the organic solvent from aqueous organic solvent extract solutions containing organic sulfonate salt is carried out as a continuous process utilizing a heel-part of aqueous organic sulfonate salt product as a diluent for the freshly added extract solution. The novel process comprises continuously introducing an aqueous-organic solvent extract solution and a heel-part of aqueous organic sulfonate salt product into a vaporization zone maintained under moderate vacuum wherein the resulting mixture is subjected to the action of externally applied fluid heated to a temperature within the range of about 150° to 260° F. to vaporize the organic solvent present in the mixture. The vaporized organic solvent is removed and the aqueous organic sulfonate salt product remaining is withdrawn and stored in a suitable product holding vessel to await further operation treatment.

In addition to providing a novel process for preparing aqueous organic sulfonate salt products containing less than 0.1% organic solvent by weight, the instant invention further provides a novel process for recovering substantially all the organic solvent previously employed in the extraction process. Moreover, the invention provides a method for preparing an aqueous organic sulfonate salt product substantially free from certain undesirable decomposition products which sometimes result from hydrolytic side reactions.

The novel process of the present invention is applicable generally to the removal of organic solvent from all aqueous organic solvent solutions containing organic sulfonate salt which have been extracted from neutralized sulfonation reaction mixtures. The process may be applied, for example, to the removal of organic solvent from aqueous organic solvent solutions which have been extracted from neutralized sulfonation reaction mixtures produced by neutralizing sulfonic acid mixtures obtained by sulfonating low and high molecular weight saturated and unsaturated aliphatic alcohols, monoglycerides, esters, phenols, olefins, ketones, ethers, and the corresponding aromatic, hydroaromatic, and alkylated aromatic hydrocarbon compounds and halogenated derivatives, etc., with common sulfonating agents such as sulfuric acid, oleum, sulfur trioxide, alone or in admixture with pyridine or ethers, sulfonyl halides, etc.

It will be understood that the term "organic sulfonate salt," unqualified, is used generically in the specification and appended claims to include both "true sulfonates," i. e., compounds in which the sulfur atom is attached directly to the carbon atom as well as "sulfates," i. e., compounds in which the sulfur atom is attached to the carbon atom through an oxygen atom.

In order to indicate more specifically the advantages and capabilities of the novel process of the present invention, reference is made to the following description, taken in conjunction with the accompanying drawing, which by way of illustration, indicates diagrammatically a preferred form of apparatus for carrying out the novel continuous process.

Referring to the drawing, in accordance with the operation of the process, a suitable neutralized sulfonation reaction mixture is conducted from storage tank 10 through conduit 12 to the inlet side of a variable delivery pump 14. The mixture is then delivered by pump 14 through conduit 16 to an extraction column 18 in the form of a spray or multiple jets as illustrated on the drawing. The spray effect may be achieved by any suitable means, e. g., by spray nozzles 20 (one shown) fitted to the discharge end of conduit 16.

Organic solvent enters column 18 through bubble cap distributors 22 (one shown) secured to delivery pipe 24. The organic solvent rises in column 18 and comes into contact and mixes with falling droplets of the neutralized sulfonation reaction mixture whereupon two separate phases and an interface 26 form. A heavier raffinate phase, which is essentially a saturated aqueous solution of inorganic salt, passes to the bottom of column 18 and is withdrawn at raffinate outlet 28. In order to facilitate a rapid two phase separation it is necessary to maintain the interface 26 at a level below the distributors 22. One satisfactory method for maintaining the interface at the desired liquid level comprises the utilization of hydrostatic balance which may be achieved by employing a simple liquid leg consisting of a flexible connecting means 32 extending between the raffinate outlet 28 and an overflow chamber 34.

A lighter extract phase consisting essentially of an aqueous solution of the organic sulfonate salt and organic solvent substantially free from inorganic salt rises to the top of column 18 and overflows into conduit 36. The extract phase is then diluted 1:1 with water and conducted by pump 38 through a conduit 40 into tubes 42 of a multiple tube vaporizer 44 maintained under vacuum. Fluid heated to a temperature within the range of about 230° to 260° F. is introduced into vaporizer 44 through a pipe 46 and circulated over tubes 42 to vaporize the aqueous-organic solvent present in the extract phase.

A two component system (vapor and liquid) leaves the upper end of vaporizer 44 and passes to separator 48 through conduit 50. The aqueous-organic solvent vapor is separated and discharged from separator 48 and is condensed in condenser 52. The liquid material remaining passes through conduit 54, one portion of said liquid passing through conduit 56 into conduit 40 as a recycle stream for passage through tubes 42 of vaporizer 44. The remaining portion of said liquid is then conducted through conduit 58 by a pump 60 which forces the same through a conduit 62 into the tubes 64 of a second multiple tube vaporizer 66, similar in structure to vaporizer 44, which is maintained under moderate vacuum. The liquid is diluted 1:1.5 with water at any convenient point in conduits 58 or 62. Fluid heated to a temperature within the range of about 150° to 260° F. is introduced into vaporizer 66 through a pipe 68 and is circulated over tubes 64 to vaporize the aqueous-organic solvent present in the mixture.

The two component system (vapor and liquid) leaving the upper end of vaporizer 66 is conducted to separator 70 through conduit 72. The aqueous-organic solvent vapor is separated and discharged from separator 70 and is condensed in condenser 74. The separated liquid material remaining comprises the desired aqueous organic sulfonate salt product. This liquid material is conducted through conduit 76, one portion passing through conduit 77 into conduit 62 as a recycle stream for passage through tubes 64 of vaporizer 66. The remaining portion of the liquid material is conducted through conduit 78 to a pump 80 which withdraws the same to a suitable product holding vessel 82.

The aqueous-organic solvent condensate issuing from condensers 52 and 74 passes through a conduit 82 to a pump 84 which forces the mixture through conduit 86 to an organic solvent recovery unit 88 furnished with heating coils 90. The aqueous-organic solvent condensate is fractionally distilled to recover the organic solvent; the water remaining is withdrawn from recovery unit 88 through conduit 92 and discarded. The recovered organic solvent vapor issuing from recovery unit 88 passes through a conduit 94 to a condenser 96 where the vapor is condensed. Pump 98 withdraws the condensed organic solvent from condenser 96 and forces the same through conduits 100 and 24 and then back into extractor 18 through distributors 22 for re-use in the system. As shown on the drawing, any required organic solvent make-up may be introduced into the system at any convenient point in conduit 100.

As indicated in the foregoing description of the operation of the process of the present invention, the removal of organic solvent from the aqueous-organic solvent extract solutions is effected in vaporizers 44 and 66 in the presence of a recycle stream or heel-part of aqueous organic sulfonate salt product. The removal of the organic solvent is effected in this manner so that the material entering the tubes 42 and 64 in the vaporizers 44 and 66 will have a solids content sufficient to prevent undesirable foaming in the vaporizers and consequent loss of organic sulfonate salt to the condensers.

The amount of heel-part introduced into the recycle stream is suitably controlled so that there will be a substantial excess of said heel-part over the aqueous-organic solvent extract solution. The proportion of heel-part to extract material, in parts by weight respectively, is maintained preferably between about 5:1 and 20:1 or higher. The dilution ratio or heel-part to extract solution is obtained by suitably controlling the rate of flow during circulation of the recycle stream relative to the rate of addition thereto of the extract solution. For example, provided the extract solution is introduced at the rate of two parts per minute, in order to maintain a dilution ratio of heel-part to extract of, for example, ten parts to one respectively, the heel-part is circulated through the vaporizers at the rate of 20 parts per minute.

When the aqueous-organic solvent extract solution being treated contains organic sulfonate salts which are subject to hydrolysis, e. g., salts such as the sodium salt of the sulfuric acid esters of coconut oil fatty acid monoglycerides, the fluid introduced into vaporizers 44 and 66 through pipes 46 and 68 preferably is heated to a temperature of about 150° to 230° F., although somewhat lower or higher temperatures may be used if desired. The indicated temperature range, however, appears to be the maximum which may be used satisfactorily without causing undesirable hydrolytic decomposition of the sulfonate material. On the other hand, when it is desired to remove organic solvent from extract solutions containing organic sulfonate salt materials which are not as susceptible to hydrolysis as the monoglycerides, for example, materials such as the alkyl aryl sulfonates, the fluid introduced into the vaporizers through pipes 46 and 68 may be heated to higher temperatures, e. g., up to about 260° F.

Representative examples of suitable heated fluid materials which may be introduced into vaporizers 44 and 66 for circulation over pipes 42 and 64 include, for example, low pressure steam (about 6 to about 20 pounds per square inch gauge), heated air, heated hydrocarbon oils, heated Dow-therm (a mixture of diphenyl and diphenyl oxide), etc.

Vaporizers 44 and 66 are maintained under a moderate vacuum, e. g., about 0.1 to about 5.0 and preferably from about 1.0 to about 2.0 pounds per square inch absolute. While pressures below the preferred range tend to yield a greater per cent evaporation, a lower fluid temperature range, and thus greater temperature differentials between the steam and the mixture being vaporized, the use of such pressure is not recommended for economical operation of the process in warm climates, inasmuch as the water used in the condensers in such climates would have to be refrigerated.

In order to indicate even more fully the nature and capabilities of the novel process of the present invention the following specific examples are set forth to show how the process may be employed for removing organic solvent from different aqueous-organic solvent extract solutions containing organic sulfonate salt. It will be understood that these examples are presented for illustrative purposes only and that they are not intended to limit the scope of the invention in any manner. The parts given are by weight unless otherwise indicated.

EXAMPLE 1

A charge consisting essentially of a heel-part comprising about 37.13% of the sodium salt of the sulfuric acid esters of coconut oil fatty acid monoglycerides, about 62.81% water, and about 0.06% isopropanol is circulated through the tubes of a vaporizer maintained under a pressure of around 1.0 pound per square inch absolute. To this heel-part there is introduced continuously an aqueous-organic solvent extract solution comprising about 15.80% sodium monoglyceride sulfate, about 83.5% water and about 0.7% isopropanol, the extract solution being introduced into the heel-part immediately prior to the passage of the resultant mixture through the tubes of the vaporizer. In order to prevent foaming and subsequent loss of the sulfonate material a solids concentration of the mixture entering the vaporizer tubes is maintained at around 35% by circulating the heel-part at a rate of about 5 parts per minute while the extract solution is introduced into the system at a rate of about 1 part per minute.

Low pressure steam (about 6 pounds per square inch gauge) is introduced into the vaporizer and circulated over the exterior walls of the tubes to vaporize the aqueous-organic solvent present in the mixture. The vaporized alcohol is removed and an aqueous sodium monoglyceride sulfonate product containing about 0.66% isopropanol is continuously withdrawn to a suitable storage vessel.

EXAMPLE II

Following the procedure set forth in Example I an aqueous-organic solvent extract solution containing about 18% sodium alkyl aryl sulfonate, about 81% water and about 1% tertiary butanol is subjected to the action of externally applied Dow-therm, heated to a temperature of about 260° F., in a vaporizer maintained under a pressure of approximately 1.5 pounds per square inch absolute in the presence of a circulating heel-part comprising about 40% sodium alkyl aryl sulfonate, about 59.92% water and about 0.08% tertiary butanol. A dilution ratio of about 8 parts heel-part to about one part extract is maintained to insure a solids content in the mixture entering the vaporizer tubes of around 35 to 40% to prevent foaming and loss of the sulfonate salt.

EXAMPLE III

*Part A.*—A charge consisting of a heel-part comprising about 40% ammonium monoglyceride sulfonate, about 57% water, and about 3% ethanol is circulated through the tubes of a vaporizer which is maintained under a pressure of about 1.9 pounds per square inch absolute. To this heel-part there is added continuously an aqueous-organic solvent extract solution comprising about 15% ammonium monoglyceride sulfonate, 75% water, and about 10% ethanol, the extract solution being introduced into the heel-part just before the resulting mixture is passed through the tubes of the vaporizer. The solids concentration in the mixture is kept between about 35% and 40% by passing the heel-part through the vaporizer at a rate of about 15 parts per minute while the extract solution is introduced at a rate of about 1 part per minute. Air heated to a temperature of about 150° F. is introduced into the vaporizer and passed over the tubes to vaporize the alcohol present in the mixture. The resultant two component mixture (vapor and liquid) is conducted to a separator where the vaporized alcohol is removed.

*Part B.*—The liquid material remaining is diluted with water to produce a solution comprising about 16.0% ammonium monoglyceride sulfonate, about 82.8% water, and about 1.2% ethanol. This material is introduced into a continuously flowing heel-part of aqueous extract containing approximately 40.0% ammonium monoglyceride sulfonate, about 63.95% water, and about 0.09% ethanol, the heel-part and the diluted liquid material being introduced in the proportion of about 10:1. The resulting mixture is passed through the tubes of a vaporizer which is maintained under a pressure of about 3 pounds per square inch absolute wherein said mixture is subjected to the action of externally applied air heated to a temperature of about 235° F. to vaporize the alcohol. The resultant vapor-liquid mixture is separated and an aqueous ammonium monoglyceride sulfonate product containing about 0.09% ethanol is continuously withdrawn from the system.

EXAMPLE IV

*Part A.*—About 100 parts of a neutralized sulfonation reaction mixture comprising about 13.6% of the sodium salt of the sulfuric acid esters of coconut oil fatty acid monoglycerides (active ingredient), about 24.5% sodium sulfate, and about 61.9% water are introduced into an extraction column together with about 100 parts of 75% Cellosolve. The resulting liquid mass quickly separates into two distinct layers. The lower layer, containing substantially all of the sodium sulfate, is removed and discarded while the upper layer, containing substantially all the active ingredient and Cellosolve, is withdrawn and diluted with water in an amount sufficient to produce an aqueous-Cellosolve extract solution containing about 15.6% active ingredient, about 68.9% water and about 15.6% Cellosolve.

*Part B.*—The aqueous-Cellosolve extract solution thus obtained is introduced into a circulating heel-part of extract material (containing about 40.1% active ingredient, about 56.2% water, and about 3.7% Cellosolve) just before said heel-part is passed through the tubes of a vaporizer which is maintained under a pressure of about 2.0 pounds per square inch absolute. The heel-part is passed through the vaporizer at a rate of 8 parts per minute and the aqueous-Cellosolve extract obtained in Part A is introduced at a rate of 1 part per minute.

Low pressure steam (about 6 pounds per square inch guage) is introduced into the vaporizer and passed over the tubes to vaporize the Cellosolve present in the mixture. The resultant two component mixture (vapor and liquid) is conducted to a separator where the vaporized Cellosolve is removed.

*Part C.*—The liquid material remaining is diluted with water to produce a solution consisting of about 16.0% active ingredient, about 82.5% water and about 1.5% Cellosolve and is then subjected to further treatment in accordance with the procedure described in Part B, Example III, using low pressure steam (about 5 pounds per square inch guage). The further treatment is carried out using 6 parts of a heel-part solution containing 38% active ingredient, 61.93% water, and 0.07% Cellosolve for each part of the diluted liquid material obtained in Part B of this example.

While there has been disclosed and described what is at present considered to be the preferred embodiment of the present invention, it will be understood, of course, that many modifications and changes and substitutions may be made therein without departing from the true scope of the invention as defined in the appended claims.

Having thus described the invention, what is claimed is:

1. A continuous process for removing organic solvent from aqueous-organic extract solutions containing salts of organic materials selected from the group consisting of organic sulfonic acids and sulfuric acid esters to produce aqueous products containing salts of said organic materials having excellent detergent properties which comprises continuously introducing said aqueous-organic solvent extract solution and a heel-part of aqueous product containing salts of said organic materials into a vaporization zone maintained under moderate vacuum, the ratio of said heel-part to said extract solution being about 5:1 to about 20:1 parts by weight respectively, heating the resulting mixture to a temperature within the range of about 150° to 260° F. in said vaporization zone, and continuously withdrawing aqueous product containing salts of said organic materials substantially free of organic solvent.

2. A continuous process for removing organic solvent from aqueous-organic solvent extract solutions containing salts of organic materials selected from the group consisting of organic sulfonic acids and sulfuric acid esters to produce aqueous products containing salts of said organic materials having excellent detergent properties which comprises continuously introducing said aqueous-organic solvent extract solution and a heel-part of aqueous product containing salts of said organic materials into a vaporization zone maintained under moderate vacuum, said extract solution being brought into initial contact with said heel-part immediately prior to passage of the resulting mixture through said vaporization zone, the ratio of said heel-part to said extract solution being about 5:1 to about 20:1 parts by weight respectively, heating the resulting mixture to a temperature within the range of about 150° to 260° F. in said vaporization zone, and continuously withdrawing aqueous product containing salts of said organic materials substantially free of organic solvent.

3. A continuous process for concentrating aqueous-organic solvent extract solutions containing salts of organic materials selected from the group consisting of organic sulfonic acids and sulfuric acid esters to produce aqueous solutions containing salts of said organic materials which are substantially free of organic solvent and which have excellent detergent properties which comprises establishing a concentrated heel-part, continuously withdrawing a portion of said heel-part and circulating the same through a vaporization zone maintained under moderate vacuum, continuously introducing an aqueous-organic solvent extract solution containing salts of said organic materials into said circulating heel-part, said extract solution being brought into initial contact with said heel-part immediately prior to circulation of the resulting mixture through said vaporization zone, the ratio of said heel-part to said extract solution being about 5:1 to about 20:1 parts by weight respectively, vaporizing solvent and water from the mixture under the influence of heat within the range of about 150° to 260° F. in said vaporization zone, and continuously withdrawing an aqueous solution containing salts of said organic materials substantially free of organic solvent.

4. A continuous process for treating aqueous-organic solvent extract solutions containing salts of organic materials selected from the group consisting of organic sulfonic acids and sulfuric acid esters to produce aqueous concentrates containing salts of said organic materials which are substantially free of organic solvent and which have excellent detergent properties which comprises establishing a concentrated heel-part, continuously withdrawing a portion of said heel-part and circulating the same through a vaporization zone maintained under moderate vacuum, continuously introducing an aqueous-organic solvent extract solution containing salts of said organic materials into said circulating heel-part, said extract solution being brought into initial contact with said heel-part immediately prior to circulation of the resulting mixture through said vaporization zone, the ratio of said heel-part to said extract solution being about 5:1 to about 20:1 parts by weight respectively, heating the mixture by indirect heat exchange with fluid heated to a temperature within the range of about 150° to 260° F. in said vaporization zone to vaporize the organic solvent present in said mixture, continuously separating the vaporized organic solvent from the mixture, and continuously withdrawing aqueous concentrate containing salts of said organic materials substantially free of organic solvent.

5. A continuous process as set forth in claim 4 in which the salt of said organic material comprises a water soluble salt of the sulfuric acid esters of coconut oil fatty acid monoglycerides.

6. A continuous process as set forth in claim 4 in which the salt of said organic material comprises a water soluble salt of a sulfonated alkylated aromatic hydrocarbon compound.

7. A continuous process for purifying aqueous-organic solvent extract solutions containing salts of organic materials selected from the group consisting of organic sulfonic acids and sulfuric acid esters to produce aqueous products containing salts of said organic materials which are substantially free of organic solvent and which have detergent properties which comprises establishing a heel-part of previously purified material containing salts of said organic materials, continuously introducing an aqueous-organic solvent extract solution containing salts of said organic materials into said heel-part of previously purified material, the ratio of said previously purified material to said extract solution being about 5:1 to about 20:1 parts by weight respectively, passing the resulting mixture into a vaporization zone maintained under moderate vacuum, heating the said mixture while in the vaporization zone to a temperature within the range of about 150° to 260° F. to vaporize the organic solvent present in the mixture, removing the organic solvent vapor, and continuously withdrawing a purified aqueous product containing salts of said organic materials.

8. A continuous process for purifying aqueous-organic solvent extract solutions containing salts of organic materials selected from the group consisting of organic sulfonic acids and sulfuric acid esters to produce aqueous products containing salts of said organic materials which are substantially free of organic solvent and which have detergent properties which comprises continuously introducing an aqueous-organic solvent extract solution containing salts of said organic materials into a circulating heel-part of previously purified material containing salts of said organic materials, the ratio of said previously purified material to the extract solution being within the range of about 5:1 to about 20:1 parts by weight respectively, passing the resulting mixture into a vaporization zone maintained under moderate vacuum, heating the said mixture while in said vaporization zone to a temperature within the range of about 150° to 260° F. to vaporize the organic solvent present in the mixture, removing the organic solvent vapor, and continuously withdrawing a purified aqueous product containing salts of said organic materials.

9. A continuous process for concentrating aqueous-organic solvent extract solutions containing salts of organic materials selected from the group consisting of organic sulfonic acids and sulfuric acid esters to produce aqueous mixtures containing salts of said organic materials which are substantially free of organic solvent and which have excellent detergent properties which comprises establishing a concentrated heel-part, continuously withdrawing a portion of said heel-part and circulating the same through a vaporization zone maintained under a pressure of about 0.1 to about 5.0 pounds per square inch absolute, continuously introducing an aqueous-organic solvent extract solution containing salts of said organic materials into said circulating heel-part immediately prior to passage of the same through said vaporization zone, the ratio of said concentrated heel-part to the extract solution being within the range of about 5:1 to about 20:1 parts by weight respectively, heating the mixture of heel-part and extract in said vaporization zone by indirect heat exchange with low pressure steam, and continuously withdrawing an aqueous product containing salts of said organic materials substantially free of organic solvent.

10. A continuous process for concentrating aqueous-organic solvent extract solutions containing salts of organic materials selected from the group consisting of organic sulfonic acids and sulfuric acid esters to produce aqueous mixtures containing salts of said organic materials which are substantially free of organic solvent and which have excellent detergent properties which comprises establishing a concentrated heel-part, continuously withdrawing a portion of said heel-part and circulating the same through a vaporization zone maintained under a pressure of about 0.1 to about 5.0 pounds per square inch absolute, continuously introducing an aqueous-organic solvent extract solution containing salts of said organic materials into said circulating heel-part immediately prior to passage of the same through said vaporization zone, the ratio of said concentrated heel-part to the extract solution being within the range of about 5:1 to about 20:1 parts by weight respectively, heating the mixture of heel-part and extract while in said vaporization zone by indirect heat exchange with steam at a pressure of approximately 6 pounds per square inch guage to vaporize the organic solvent present in the mixture, continuously removing the vaporized organic solvent from the mixture, and continuously withdrawing an aqueous product containing salts of said organic materials substantially free of organic solvent.

11. A continuous process for concentrating aqueous-organic solvent extract solutions containing salts of organic materials selected from the group consisting of organic sulfonic acids and sulfuric acid esters to produce aqueous products containing salts of said organic materials which are substantially free of inorganic salts and organic solvent and which have excellent detergent properties which comprises continuously extracting an aqueous-organic solvent solution containing salts of said organic materials from a neutralized sulfonation reaction mixture by treating said reaction mixture with an organic solvent, continuously introducing the extracted solution into a circulating heel-part of previously concentrated material containing salts of said organic materials, the ratio of said heel-part to the extracted solution being within the range of about 5:1 to about 20:1 parts by weight respectively, passing the resulting mixture into a vaporization zone maintained under moderate vacuum, heating the said mixture while in said vaporization zone by indirect heat exchange with low pressure steam to vaporize the organic solvent present in the mixture, removing the organic solvent vapor, and continuously withdrawing an aqueous product containing salts of said organic materials substantially free of inorganic salt and organic solvent.

HERBERT WIDENER ANDREWS.
CLIFFORD LE ROY CARPENTER.
HAROLD GEORGE HOULTON.

References Cited in the file of this patent
UNITED STATES PATENTS

| Number | Name | Date |
|---|---|---|
| Re. 22,548 | Brant | Sept. 26, 1944 |
| 2,316,719 | Russell | Apr. 13, 1943 |
| 2,413,311 | Cohen | Dec. 31, 1946 |